July 11, 1972  H. R. HALL  3,676,098

METHOD OF BENDING GLASS SHEETS

Filed July 16, 1970

INVENTOR
Harold R. Hall
BY
Collins & Oberlin
ATTORNEYS

United States Patent Office 3,676,098
Patented July 11, 1972

3,676,098
METHOD OF BENDING GLASS SHEETS
Harold R. Hall, Toledo, Ohio, assignor to Libbey-Owens-Ford Company, Toledo, Ohio
Filed July 16, 1970, Ser. No. 55,394
Int. Cl. C03b 23/02
U.S. Cl. 65—106
4 Claims

ABSTRACT OF THE DISCLOSURE

A method of bending glass sheets in which a sheet, that has been heated to a temperature at which the glass softens, has a surface thereof cooled prior to bending the heated and softened sheet against a shaping mold; together with apparatus for use in performing this method.

BACKGROUND OF THE INVENTION

Field of the invention

The present invention relates generally to the bending or shaping of glass sheets and more particularly to a method and apparatus designed to produce bent glass sheets of improved properties and more accurately predetermined curvatures.

DESCRIPTION OF THE PRIOR ART

In the manufacture of bent or curved glass sheets in large quantities such as in the commercial production of automobile windows and windshields, it has become customary to convey the sheets successively through a heating area, a bending area and an annealing or tempering area in a substantially continuous manner on externally driven, horizontally arranged roll-type conveyors; and this presents a number of problems. Thus, it involves handling glass sheets of a variety of sizes that have been cut to an outline shape depending on the opening they are adapted to glaze, and the necessity for bending them to rather precise curvatures. Moreover, toward the end of the heating step and into the bending step the glass is in a heat softened condition in which it is not only extremely vulnerable to distortion and surface marring but may also be susceptible to partial loss of its bent curvature.

As a consequence serious production losses and inferior quality glazings have resulted from accidental or inadvertent overheating of the furnace within which the glass sheets were being raised to bending temperature and, also, in cases where higher or non-uniform furnace temperatures were required or desirable to produce special shapes, curvatures or designs.

In cases of accidental overheating, even when they are discovered very quickly, the high speed, production line character of the operation invariably turns out an appreciable number of rejects before the necessary adjustments and corrections can be made to the heating elements and the furnace cooled down. The purposeful increases or variations in temperature of course present even more of a problem because, there, higher temperatures are being applied to parts or all of the sheets because they are necessary to obtain a desired result.

SUMMARY OF THE INVENTION

Accordingly it is the primary object of this invention to provide a method and apparatus for accurately bending glass sheets to predetermined curvatures.

Another object is to provide, in connection with conventional glass sheet bending procedures, a method of and apparatus for regulating and retaining the final or finished curvatures in the bent glass sheets.

Still another object is to provide a method and apparatus of the above character by means of which the temperature in defined areas of a heated sheet of glass can be brought within selected ranges of differing temperature at which such defined areas can be bent to differing curvature that blend into one another and are retained in the finished sheet.

Further objects and advantages of the invention will become apparent during the course of the following description when read in connection with the accompanying drawings.

In the drawings wherein like numerals are employed to designate like parts throughout the same:

DESCRIPTION OF PREFERRED EMBODIMENTS

Figure 1:
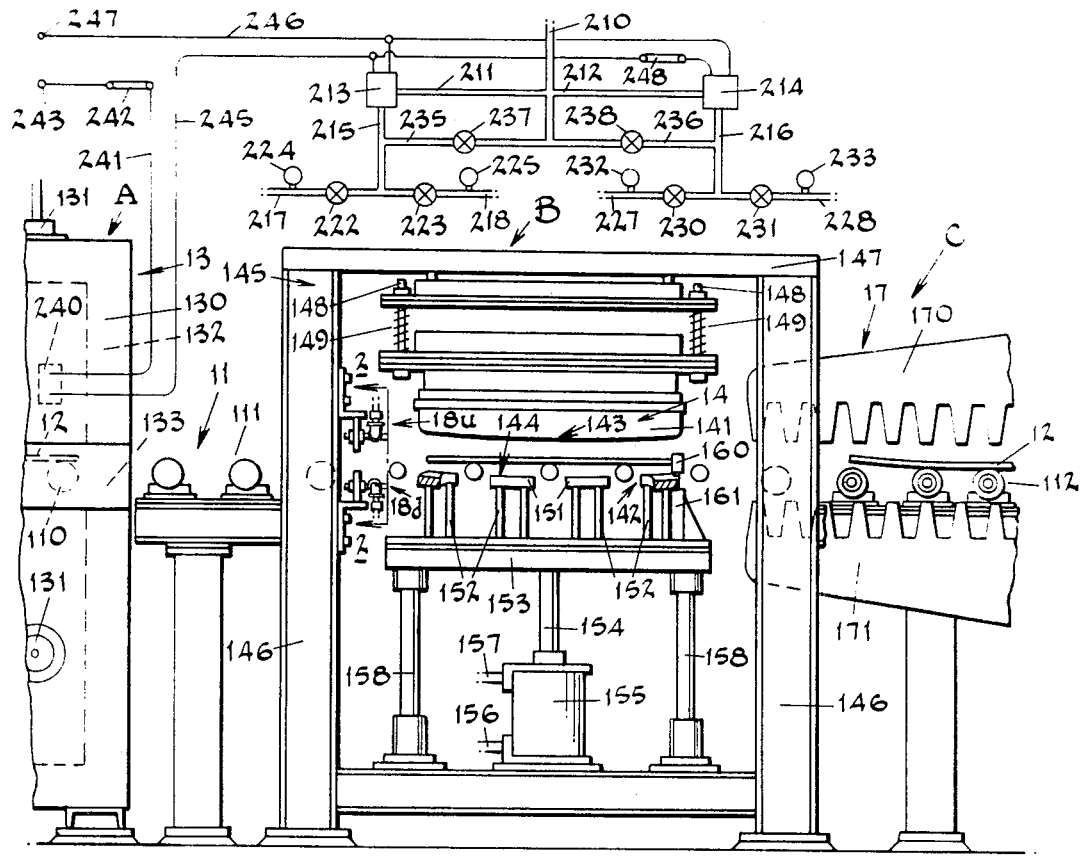
FIG. 1 is a side elevational view of a bending apparatus incorporating the features of the present invention.

In FIG. 1 of the drawings the structural features of the present invention are shown incorporated in a generally conventional bending and tempering apparatus of a type particularly adapted for use in the production of automotive glass by a substantially continuous process.

Thus, as illustrated, cooling means are arranged between the furnace and bending mold of the apparatus for supplying a cooling fluid, such as air, against a surface or the surfaces of the sheets moving therethrough to so lower the temperature of any overheated glass sheet to a degree compatible with the accurate and maintained bending thereof. Similarly the cooling air may be utilized, during normal or particular operations, to lower the temperature of a selected area of a sheet to equalize the heated condition of that area with that of an adjoining area as well as to provide other and preferred types of cooling influence on glass sheets of a variety of pattern-cut shapes.

More particularly, the conventional portion of the apparatus of FIG. 1 includes a conveyor system 11 operable to carry glass sheets 12 along a predetermined horizontal path through a heating area A, having a furnace 13 for heating the glass sheets to the required temperature; a bending area B having bending means 14 for shaping the sheets to the desired curvature, and a tempering area C having cooling means 17 for rapidly reducing the temperature of the sheets to produce the desired tempered condition therein.

The furnace 13, utilized in the present instance to heat the sheets to the required temperature for bending, comprises an elongated tunnel-type heating chamber 130 denfined by walls constructed of suitable insulation materials and heated by burners 131 or equivalent heating devices. Glass sheets 12 are moved through the chamber 130 on a roller-type conveyor 110, which forms a part of the conveyor system 11 and extends from an entry end of the chamber (not shown) to an oppositely disposed exit end wall 132 where the heated sheets pass through a slot or opening 133 and proceed into the bending area B.

As the heated glass sheets are moved out of the furnace 13, they are received on a second roller conveyor 111, which is also part of the conveyor system 11, and moved through the bending means 14. After being bent, each sheet 12 is advanced into the cooling area C wherein the temperature is rapidly reduced by the cooling means 16 to develop a tempered condition in the glass. As herein shown the cooling means 17 comprises so-called blastheads 170 and 171 arranged above and below the path of movement of the sheets and operable to direct opposed streams of cooling fluid, such as air, toward said path and simultaneously against the opposite surfaces of the sheet. The sheets are carried along their horizontally directed path between the blastheads 170 and 171 on a third roller conveyor 112 arranged in end-to-end alignment with the conveyors 110 and 111 to complete the conveyor system 11.

Returning to the bending means 14, this includes a bending mold structure having male and female mold members 141 and 142, respectively, adapted to press the heated glass sheets to the desired curvature therebetween. For this purpose, the opposed faces of the mold members are formed with complemental, interfitting shaping surfaces 143 and 144 conforming in curvature to that of the sheets when bent. These mold parts 141 and 142 are movable relative to one another and to the path of sheet movement to bring the shaping surfaces into pressing engagement with the opposite surfaces of the heated sheets.

The bending means 14 also includes a suitable supporting framework 145 having vertically disposed pedestals or columns 146 disposed at each side of and spaced apart longitudinally along the path of sheet movement. Above the conveyor 111, the columns support and are thus joined by horizontally disposed beams, such as the beam 147. The male, or upper, mold member 141 is supported by the beams 147 of the framework 145 by bolts 148 and resiliently spaced therefrom by springs 149 surrounding the bolts and acting as cushions to absorb excessive pressure from being otherwise exerted on the glass sheet by the action of the lower, or female, mold member 142.

The shaping surface of the mold member 142 is of the ring-type outline which engages only the marginal edge portions of the glass sheet during the pressing action. To provide clearance for the rolls of the conveyor 111 and to permit the lower member 142 to be moved vertically into and out of pressing relation with the upper mold member 141, the ring-type outline of said member is formed by spaced bar-like segments 151 supported by pillars 152 on a base 153. This base is mounted on the ram 154 of an air cylinder 155, the ends of which are connected to a source of pressure by pipes 156 and 157. Vertical movement of the base 153 and mold member 142 is ensured by guide members 158. Also, each sheet is halted between the vertically spaced mold members by engagement of its leading edge with stop members 160 which are adapted to be moved by associated air cylinders 161 into and out of the path of sheet movement.

Now it is well known to bend glass sheets by the part of the apparatus of FIG. 1 that has just been described, and which does not include a cooling means between the heating furnace and the bending mold. However, in so doing, conditions are commonly encountered that preclude bending of the glass sheets to precise curvatures and/or maintaining the bent sheets in the curvature to which they have been bent. For example, one not unusual occurrence that produces an objectionable rise in the temperature of the heated glass results from so-called pressure surges in the fuel supply to the burners 131 of the furnace 13. Such surges cause an unbalance in normally-controlled ranges of temperature in the zones of the furnace which may cause only a temporary emergency in furnace operation, or continue over a longer period of time with the result that an ever increasing number of the glass sheets being heated will have temperatures ranging, by way of example, from 30° to 50° F. above the temperature range at which the glass sheets should be introduced into the bending means 14.

When such "overhead" glass sheets pass between mold members 141 and 142, are bent thereby, returned to the conveyor 111, and then cooled, they will be found to have lost a substantial amount of the curvature to which they were bent due to relaxing by the too-hot sheet from its bent configuration which, in its overheated condition it is unable to retain. This is termed in the art a "fall-back" condition of the marginal edges of the sheet and shows itself under inspection as a nonconforming bend of shallower or non-symmetrical curvature that will not meet automotive specifications.

According to the present invention however such defects are prevented by the provision of cooling means, shown in FIG. 1 as air distribution members arranged in spaced relation to the entry side of the bending area and above and below the rolls of the conveyor 111. These members are substantially identical in structure and are designated in their entirety by the numerals 18$d$ and 18$u$. Each member is adapted, when connected to a source of air under pressure, the direct a stream of air against the adjacent surface of a heated sheet to lower the temperature thereof to approximately the range of temperature desired for best bending results.

Figure 3:
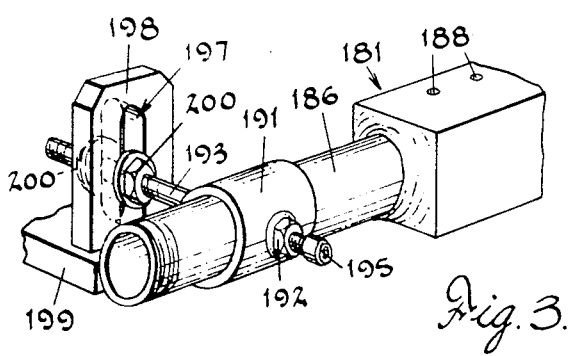
FIG. 3 is a fragmentary perspective view of an air supply tube and mounting.
Figure 4:
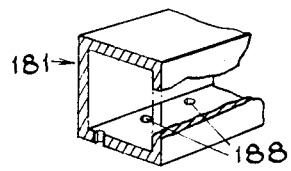
FIG. 4 is a fragmentary perspective view of an air supply tube.

For this purpose the distributor members 18$d$ and 18$u$ have body portions 181 of substantially rectangular or square cross-section that are formed by aligned sections 182 and 183. The opposed ends of the sections are united at a plate 184 which forms a bulkhead in the medial area of the body portion. The outer end of each section 182 and 183 is equipped with a treaded pipe extension 186 secured as by welding or like methods. As viewed in FIG. 3, the upper wall of the distribution member 18$d$ is provided with a plurality or row of substantially equally spaced ports or apertures 188; similar apertures being located in the lower wall of the member 18$u$ as shown in FIG. 4.

If desired, a narrow, elongated slot extending approximately the length of the body sections 182 and 183 can be employed instead of the row of ports 188; or, in cases where a lesser cooling action is required, the members 18$d$ and 18$u$ may be solid or imperforate and have either air or water circulated therethrough to cool adjacent glass surfaces by absorption and conduction.

Figure 2:
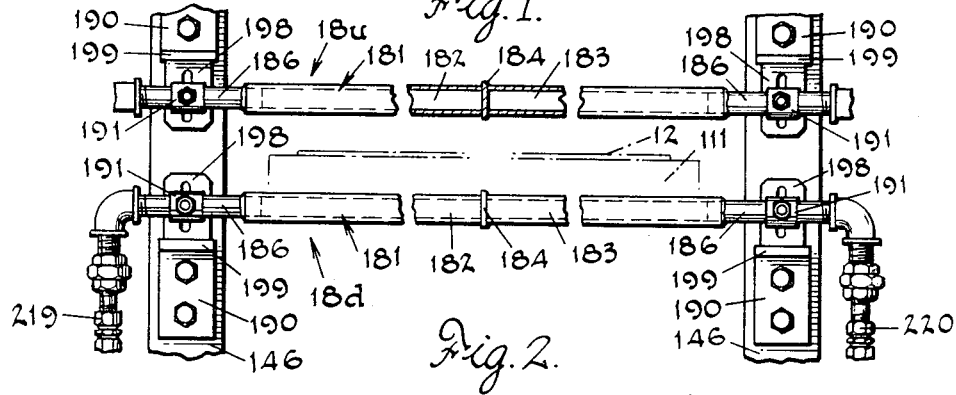
FIG. 2 is a transverse vertical sectional view taken on the plane of line 2—2 of FIG. 1.

As seen in FIGS. 1 and 2, the two air distribution members are supported on transversely disposed pedestals 146, closely adjacent the entry area of the mold member, by readily adjustable mounting means which includes fixedly-mounted brackets 190. More especially, as in FIG. 3, the mounting means comprises a sleeve or collar 191 having a nut 192 fixed on one area of its surface and a threaded rod 193 attached to a diametrically aligned area of the sleeve surface.

A mounting collar 191 is received on each of the pipes 186 and by means of a set-screw 195 threaded into the nut 192 is rigidly connected thereto. This arrangement permits shifting of a body portion 181 about its longitudinal axis as well as endwise movements of adjustments. The threaded rod 193, in each instance, is inserted through a slot 197 provided in a flange 198 formed on the leg 199 of the associated bracket 190; the rod being equipped with nuts 200. Manipulation of the rod within the slot 197 permit vertical adjustment of each end of the distributor body portion 181 while movement of the nuts 200 along the rods 193 similarly will permit shifting of the body portion in a horizontal plane until one or the other of the nuts is turned up tightly to clamp the flange therebetween.

With reference to FIG. 1, there is additionally illustrated means for supplying air under controlled pressure to the distributor members from a source of supply—the pipe 210. This pipe by branch pipes 211 and 212 is connected to electrically controlled solenoid valves 213 and 214; each having an outlet pipe 215 and 216. Pipe 215 continues by pipes 217 and 218 to suitable connections 219 and 220 (FIG. 2) attached to the pipe extensions 186 of the air distributor member 18$d$. Since it is intended that air is to be supplied to one or both sides, body sections 182 and 183 of the distributor hand-control valves 222 and 223 are included in the pipes 217 and 218. And the degree of air pressure to the opposite sections of the distributor can be determined by use of gauges 224 and 225. This is also true with regard to pipe 216 which through pipes 227 and 228, having hand valves 230–231 and gauges 232–233, are connected to the pipe extensions 186 of the upper distributor member 18u.

It is intended, when desired, for the solenoid valves 213 and 214 to be by-passed and the supply pipe 210 connected by pipes 235 and 236, through hand valves 237 and 238, to the pipes 215 and 216. In this way, the connection of the distributor members 18d and 18u to the supply pipe 210 can be made controlled either manually or automatically.

When operated automatically, a temperature sensing device, such as an optical pyrometer 240, within the heating chamber 130 of the furnace 13 is connected by line 241 through a manual switch 242 to a source of electric energy 243. When activated by an objectionable rise in temperature within the chamber, the pyrometer 240 completes a circuit by line 245 through the valve 213 and line 246 to the opposite electric source 247. Continuation of line 245 is also made, when desired, through a manual switch 248 through the solenoid valve 214, as will hereinafter be more fully explained.

OPERATION

Operation of a continuous bending and tempering apparatus as herein disclosed can be readily understood by reference to FIG. 1. Flat sheets of glass 12 are loaded onto the rolls of the conveyor 110 at the entrance end (not shown) of the furnace 13 and moved through the heating chamber 130 wherein the sheets are heated to their bending temperature. This temperature is, of course, controlled within a desired range such as, by way of example, of 1100° to 1165° F. and in normal operation, the optical pyrometer 240 will not be activated. Each heated sheet of glass passes through the slot 133 in the exit wall 132 of the furnace and is received on the rolls of the conveyor 111 to be moved into the bending area B between the mold members 141 and 142 of the bending means 14. The sheet is accurately located with regard to the complemental shaping surfaces 143 and 144 of the mold members when the leading edge engages the stops 160 located in the path of the moving sheet. The female mold member 142 is then adapted to lift the sheet from the conveyor rolls, upon the application of pressure by pipe 156 to the head end of the cylinder actuator 155, into pressing engagement between the shaping surfaces to impart the desired curvature to the sheet. Thereafter, pressure is directed by pipe 157 to the rod end of the cylinder 155 to lower the bent sheet to the conveyor rolls to be moved forwardly, after the stops 160 have been lowered, from the bending area onto the rolls of conveyor 112 of the tempering or chilling area C wherein the sheet is rapidly reduced in temperature by the blastheads 170 and 171 to produce a desired tempered condition in the sheet.

In carrying out the bending process described above in accordance with this invention the bad effects of sheets inadvertently overheated in the furnace 13 and therefore having a tendency to "fall-back" or sag toward the rolls after bending to thereby lose their precisely defined curvature will be effectively overcome. Thus, when the manual switch 242 is closed, the sensing device or optical pyrometer 240 will be effective to respond to any surge in fuel pressure to the burners 131 of the furnace. In other words, whenever the temperature of the furnace is raised within a range of 30° to 50° F. above the normal operating range as, for example, of 1100° to 1165° F., the pyrometer will be activated in response to the resulting increase in surface temperature of the sheets to complete a circuit by way of line 245 through the solenoid valve 213. This will automatically open communication of pipe 211 through pipes 215 and 217 and 218 to the ends of the air distributor member 18d.

In consequence, streams of air through the ports 188 will be directed against the lower surface of the sheet to produce a cooling effect therein. During manual closure of switch 248, the circuit of line 246 also energizes the solenoid valve 214 to connect branch pipe 212 to outlet pipe 216 and thereby the distributor member 18u by pipes 227 and 228. This will cause the direction of streams of air against the upper surface of the sheet to equalize the cooling effect imposed on the lower sheet surface. Sufficient lowering of temperature of the glass will overcome any tendency for the edges of the sheet to "fall-back" upon completion of the bending operation.

Even should the sensing device 140 fail to function and the overheated condition persist, resort can be had to the hand valves 237 and 238 with connection of air supply pipe 210 through pipes 235–236 to the pipes 217–218 and 227–228. Consequently, whenever an operators is aware that the glass sheets are not retaining the precisely defined curvature ot which they have been bent, use of the hand valves 237–238 will serve to cause cooling of the surfaces of the sheets, preparatory to bending, in the same manner as is otherwise produced automatically by the optical pyrometer and solenoid valve 213 and/or valve 214.

The invention also contemplates variably controlling temperature conditions in and between end areas of a heated glass sheet to be bent in order ot increase or decrease the curvature created in one end area as compared to the curvature in the opposite end area.

Indeed, the air distribution members 18d and/or 18u, for example, are well adapted to use in the application of cooling air to a selected area or selected areas of heated sheets of glass. One specific instance of this is in bending sheets intended for glazing door openings of automobiles. Many glass sheets for this purpose are initially patterncut to substantially trapezoidal outline which results in a wedge-like end area that will absorb heat more rapidly than the opposite end area which is of a more rectangular outline. One way in which such wedge-like areas can be cooled to temperatures compatible with those in the remainder of the sheet, in accordance with this invention, is through the closure of seelcted hand valves, such as valves 223 and 231 whereby the supply of air will be made through the pipes 217 and 227 to the sections 182 of the distributor body portions. The pressure of the air can also be controlled by the hand valves and observation of the gauges indicated.

Further utility of the air distributor members 18 of the invention is found in the application of air, when required, to transversely aligned sheets of glass which in pairs can be substantially simultaneously bent as "right-hand" and "lefthand" parts. In this event, the ports 188 of the upper and lower body sections will provide streams of air against the surfaces of one part while the ports of the body sections 183 will serve the same purpose with regard to the other part. Additional individual control of the degree of cooling exercised on the spaced sheets can be made, by determination of air pressure indicated by the gauges 224–225 and 232–233, and adjustment by hand valves 222–223 and 230–231, and of the pressure of air flowing through the pipes 217–218 and 227–228 to the air distribution members 18d and 18u.

The manner in which the method and apparatus of this invention can be adapted and/or employed to solve various other problems in connection with the precision bending of heated glass sheets will be readily apparent, as will the fact that the invention can be practiced with single mold gravity bending as well as with multiple mold pressure bending and in the production of annealed bent glass sheets as well as bent tempered ones.

In fact the forms of the invention herein shown and described are to be taken as preferred embodiments only of the same, and it is to be understood that various changes in the shape size and arrangement of parts as well as various procedural changes may be resorted to without departing from the spirit of the invention as defined in the following claims.

I claim:

1. In a method of bending glass sheets wherein said sheets are moved successively through a heating area in which they are heated in the flat to a temperature within the softening range of the glass, a bending area in which the flat heated sheets are shaped to a desired curvature against the surface of a bending mold located therein, and a cooling area in which the temperature of the bent sheets is substantially reduced; the improvement which comprises controlling and retaining the final bent shape of said sheets by positively cooling said flat heated sheets between said heating and said bending areas and before said sheets are moved into operative relationship to said mold.

2. A method as defined in claim 1 in which said sheets are moved through said areas along a substantially horizontal path, and said shaping of said sheets involves lifting the same on said shaping surface when they reach said operative relationship with said mold as they are moved along said path.

3. A method as defined in claim 2 in which said shaping further involves pressing said lifted sheets against the shaping surface of a second bending mold.

4. A method as defined in claim 1 in which said sheets are shaped to the desired curvature by press bending in said bending area, and the heated sheets are positively cooled in an unheated area between said heating and bending areas.

References Cited

UNITED STATES PATENTS

| | | | |
|---|---|---|---|
| 3,084,526 | 4/1963 | Richardson | 65—273 X |
| 3,244,497 | 4/1966 | Copeland | 65—162 |

ARTHUR D. KELLOGG, Primary Examiner

U.S. Cl. X.R.

65—162, 273, 275